United States Patent [19]

(12) United States Patent
Wong et al.

(10) Patent No.: US 8,195,627 B2
(45) Date of Patent: Jun. 5, 2012

(54) STORAGE POLICY MONITORING FOR A STORAGE NETWORK

(75) Inventors: Chi Ming Wong, San Francisco, CA (US); Thomas K. Wong, Pleasanton, CA (US); Panagiotis Tsirigotis, Sunnyvale, CA (US); Anand Iyengar, Mountain View, CA (US); Rajeev Chawla, Union City, CA (US); Yu Cheong Chan, Mountain View, CA (US); Zuwei Liu, Cupertino, CA (US); Matthew Seitz, San Jose, CA (US); Richard A. Simpkins, Mountain View, CA (US); Geetha Srikantan, Palo Alto, CA (US); Gaurav Gupta, Mountain View, CA (US)

(73) Assignee: Neopath Networks, Inc., Mountain View, CA (US)

( * ) Notice: Subject to any disclaimer, the term of this patent is extended or adjusted under 35 U.S.C. 154(b) by 76 days.

(21) Appl. No.: 11/241,554

(22) Filed: Sep. 30, 2005

(65) Prior Publication Data

US 2006/0080371 A1     Apr. 13, 2006

Related U.S. Application Data

(63) Continuation-in-part of application No. 10/831,376, filed on Apr. 23, 2004, now Pat. No. 7,346,664.

(60) Provisional application No. 60/615,002, filed on Sep. 30, 2004.

(51) Int. Cl.
*G06F 17/00* (2006.01)

(52) U.S. Cl. ........ 707/694; 707/822; 707/827; 707/828; 709/203; 709/219; 709/221

(58) Field of Classification Search .................. 707/602, 707/694
See application file for complete search history.

(56) References Cited

U.S. PATENT DOCUMENTS

| 5,465,335 A | 11/1995 | Anderson |
| 5,689,701 A | 11/1997 | Ault et al. |
| 5,774,715 A | 6/1998 | Madany et al. |
| 5,832,261 A | 11/1998 | Ishizaka et al. |
| 5,890,169 A | 3/1999 | Wong et al. |

(Continued)

FOREIGN PATENT DOCUMENTS

EP     0 108 338 A2     5/1984

(Continued)

OTHER PUBLICATIONS

Anderson, D.C. et al., "Interposed Request Routing for Scalable Network Storage," ACM Transactions on Computer Systems, Feb. 2002, vol. 20, No. 1, pp. 1-24.

(Continued)

*Primary Examiner* — Angela M Lie
*Assistant Examiner* — Mellissa M Chojnacki
(74) *Attorney, Agent, or Firm* — Weaver Austin Villeneuve and Sampson LLP

(57) ABSTRACT

The present invention provides selective migration in a storage network in accordance with a policy. The policy can include rules that establish which objects are migrated from a source file server to a destination file server based on file attributes (e.g., file type, file size, last access time, frequency of access). For example, large multimedia files that consume I/O bandwidth on expensive or critical file servers, without adding much value to enterprise productivity, can be migrated to a commodity or less critical file server.

20 Claims, 6 Drawing Sheets

U.S. PATENT DOCUMENTS

| | | | |
|---|---|---|---|
| 5,933,825 A | 8/1999 | McClaughry et al. | |
| 5,951,656 A * | 9/1999 | Finnell | 710/54 |
| 6,070,254 A | 5/2000 | Pratt et al. | |
| 6,101,508 A | 8/2000 | Wolff | |
| 6,192,408 B1 | 2/2001 | Vahalia et al. | |
| 6,314,460 B1 | 11/2001 | Knight et al. | |
| 6,341,302 B1 | 1/2002 | Celis | |
| 6,353,837 B1 | 3/2002 | Blumenau | |
| 6,389,427 B1 | 5/2002 | Faulkner | |
| 6,408,298 B1 | 6/2002 | Van et al. | |
| 6,442,548 B1 | 8/2002 | Balabine et al. | |
| 6,453,354 B1 | 9/2002 | Jiang et al. | |
| 6,473,401 B1 | 10/2002 | Kong et al. | |
| 6,606,690 B2 | 8/2003 | Padovano | |
| 6,615,365 B1 | 9/2003 | Jenevein et al. | |
| 6,633,887 B2 | 10/2003 | Suzuki et al. | |
| 6,694,431 B1 | 2/2004 | Binding et al. | |
| 6,697,846 B1 | 2/2004 | Soltis | |
| 6,711,625 B1 | 3/2004 | Simpson | |
| 6,738,883 B2 | 5/2004 | March et al. | |
| 6,931,410 B2 | 8/2005 | Anderson et al. | |
| 6,938,039 B1 | 8/2005 | Bober et al. | |
| 6,983,379 B1 | 1/2006 | Spalink et al. | |
| 6,985,956 B2 | 1/2006 | Luke et al. | |
| 6,996,714 B1 | 2/2006 | Halasz et al. | |
| 7,054,927 B2 | 5/2006 | Ulrich et al. | |
| 7,072,917 B2 | 7/2006 | Wong et al. | |
| 7,089,293 B2 | 8/2006 | Grosner et al. | |
| 7,092,976 B2 | 8/2006 | Curran et al. | |
| 7,096,253 B2 | 8/2006 | Vinson et al. | |
| 7,103,628 B2 | 9/2006 | Neiman et al. | |
| 7,120,666 B2 | 10/2006 | McCanne et al. | |
| 7,127,477 B2 | 10/2006 | Duncombe et al. | |
| 7,237,027 B1 * | 6/2007 | Raccah et al. | 709/226 |
| 7,254,636 B1 | 8/2007 | O'Toole et al. | |
| 7,272,613 B2 | 9/2007 | Sim et al. | |
| 7,272,654 B1 | 9/2007 | Brendel | |
| 7,308,473 B1 | 12/2007 | Thomas et al. | |
| 7,308,709 B1 | 12/2007 | Brezak et al. | |
| 7,313,579 B2 | 12/2007 | Murotani | |
| 7,324,995 B2 | 1/2008 | Findleton et al. | |
| 7,346,664 B2 | 3/2008 | Wong et al. | |
| 7,386,610 B1 | 6/2008 | Vekiarides | |
| 7,441,011 B2 | 10/2008 | Lin et al. | |
| 7,475,142 B2 | 1/2009 | Sharma et al. | |
| 7,512,673 B2 | 3/2009 | Miloushev et al. | |
| 7,562,110 B2 | 7/2009 | Miloushev et al. | |
| 7,587,422 B2 | 9/2009 | Wong et al. | |
| 7,587,471 B2 | 9/2009 | Yasuda et al. | |
| 7,720,796 B2 | 5/2010 | Wong et al. | |
| 7,831,641 B2 | 11/2010 | Wong et al. | |
| 7,844,646 B1 * | 11/2010 | Deshmukh et al. | 707/825 |
| 2002/0013832 A1 | 1/2002 | Hubbard | |
| 2002/0111929 A1 | 8/2002 | Pudipeddi et al. | |
| 2002/0120763 A1 | 8/2002 | Miloushev et al. | |
| 2002/0133491 A1 | 9/2002 | Sim et al. | |
| 2002/0154645 A1 | 10/2002 | Hu et al. | |
| 2002/0161855 A1 * | 10/2002 | Manczak et al. | 709/219 |
| 2002/0184244 A1 | 12/2002 | Hsiao et al. | |
| 2002/0199060 A1 | 12/2002 | Peters et al. | |
| 2003/0037061 A1 | 2/2003 | Sastri et al. | |
| 2003/0046270 A1 * | 3/2003 | Leung et al. | 707/1 |
| 2003/0046335 A1 | 3/2003 | Doyle et al. | |
| 2003/0056112 A1 | 3/2003 | Vinson et al. | |
| 2003/0110263 A1 | 6/2003 | Shillo | |
| 2003/0120948 A1 | 6/2003 | Schmidt et al. | |
| 2003/0126247 A1 | 7/2003 | Strasser et al. | |
| 2003/0140051 A1 | 7/2003 | Fujiwara et al. | |
| 2003/0154236 A1 | 8/2003 | Dar et al. | |
| 2003/0177178 A1 | 9/2003 | Jones et al. | |
| 2003/0182313 A1 | 9/2003 | Federwisch et al. | |
| 2003/0195903 A1 | 10/2003 | Manley et al. | |
| 2003/0204613 A1 | 10/2003 | Hudson et al. | |
| 2003/0204670 A1 | 10/2003 | Holt et al. | |
| 2003/0220899 A1 * | 11/2003 | Numanoi et al. | 707/1 |
| 2003/0220985 A1 | 11/2003 | Kawamoto et al. | |
| 2004/0010714 A1 | 1/2004 | Stewart | |
| 2004/0024963 A1 | 2/2004 | Talagala et al. | |
| 2004/0054748 A1 | 3/2004 | Ackaouy et al. | |
| 2004/0078465 A1 | 4/2004 | Coates et al. | |
| 2004/0088297 A1 | 5/2004 | Coates et al. | |
| 2004/0103104 A1 | 5/2004 | Hara et al. | |
| 2004/0117438 A1 | 6/2004 | Considine et al. | |
| 2004/0133577 A1 | 7/2004 | Miloushev et al. | |
| 2004/0133606 A1 | 7/2004 | Miloushev et al. | |
| 2004/0133650 A1 * | 7/2004 | Miloushev et al. | 709/213 |
| 2004/0133652 A1 | 7/2004 | Miloushev et al. | |
| 2004/0139167 A1 * | 7/2004 | Edsall et al. | 709/212 |
| 2004/0153481 A1 | 8/2004 | Talluri | |
| 2004/0186849 A1 * | 9/2004 | Enko et al. | 707/102 |
| 2004/0267752 A1 | 12/2004 | Wong et al. | |
| 2004/0267831 A1 | 12/2004 | Wong et al. | |
| 2005/0033932 A1 | 2/2005 | Pudipeddi et al. | |
| 2005/0055402 A1 | 3/2005 | Sato | |
| 2005/0080981 A1 | 4/2005 | Archambault et al. | |
| 2005/0125503 A1 | 6/2005 | Iyengar | |
| 2005/0188211 A1 | 8/2005 | Scott et al. | |
| 2005/0198062 A1 | 9/2005 | Shapiro | |
| 2005/0262102 A1 | 11/2005 | Anderson et al. | |
| 2006/0080371 A1 | 4/2006 | Wong et al. | |
| 2006/0129627 A1 | 6/2006 | Phillips et al. | |
| 2006/0161746 A1 | 7/2006 | Wong et al. | |
| 2006/0253501 A1 * | 11/2006 | Langan et al. | 707/201 |
| 2006/0271598 A1 | 11/2006 | Wong et al. | |
| 2007/0024919 A1 | 2/2007 | Wong et al. | |
| 2007/0074207 A1 | 3/2007 | Bates et al. | |
| 2007/0136308 A1 | 6/2007 | Tsirigotis et al. | |
| 2008/0114854 A1 | 5/2008 | Wong et al. | |

FOREIGN PATENT DOCUMENTS

| | | |
|---|---|---|
| EP | 0 926 585 | 6/1999 |
| EP | 1 209 556 | 5/2002 |
| EP | 1 311 122 A2 | 5/2003 |
| EP | 1 396 789 A2 | 3/2004 |
| JP | HEI 04-299747 | 10/1992 |
| JP | HEI 10-247155 | 9/1998 |
| JP | 2001-075843 | 3/2001 |
| JP | 2004-054607 | 2/2004 |
| JP | 2004-110290 | 4/2004 |
| JP | 2005/502096 | 1/2005 |
| WO | 2004/097571 | 4/2004 |
| WO | 2004/097686 | 4/2004 |
| WO | WO 2004/053677 | 6/2004 |
| WO | 2004/097572 | 11/2004 |
| WO | 2004/097624 | 11/2004 |
| WO | 2005/029251 | 3/2005 |
| WO | 2006/039689 | 4/2006 |
| WO | WO 2006/080371 | 8/2006 |
| WO | 2007-002855 | 1/2007 |
| WO | 2007/041456 | 4/2007 |

OTHER PUBLICATIONS

Bright, J.D. et al., "A Scalable Architecture for Clustered Network Attached Storage," Twentieth IEEE/Eleventh NASA Goddard Conference on Mass Storage Systems & Technologies, Apr. 7-10, 2003, 12 pages, Paradise Point Resort, San Diego, CA, USA.

Goldick, J., "Retry of Extending Networking Design Notes," PSC, Carnegie-Mellon University, Feb. 1995, 42 pages.

"Leveraging the Benefits of the EMC Clariion IP4700 Network File Server With the Oracle8i Database," an Engineering White Paper, Mar. 5, 2002, EMC Corporation.

Notification of Transmittal of the International Search Report and the Written Opinion, PCT/US04/12841, Oct. 13, 2004, 9 pages.

"Notification of Transmittal of the International Search Report and the Written Opinion of the International Searching Authority, or the Declaration," for PCT/US04/12844, Mar. 14, 2005, 14 pages.

Notification of Transmittal of the International Search Report and Written Opinion, PCT/US04/12846, Sep. 28, 2004, 8 pages.

Notification of Transmittal of the International Search Report and Written Opinion, PCT/US04/12847, Nov. 3, 2004, 7 pages.

Notification of Transmittal of the International Search Report and the Written Opinion, PCT/US04/30180, Mar. 27, 2006, 8 pages.

Yamakawa et al., "NAS Switch: Virtualized Integration Techniques of NFS Server", Engineering Research Report of Institute of Electronics, Information and Communication Engineers published by Institute of Electronics, Information and Communication Engineers, Japan, Aug. 12, 2002, vol. 102, No. 275, pp. 13-18. Japan.
Notice of Allowance with Examiner Interview and Amendment dated Dec. 29, 2009 for U.S. Appl. No. 10/832,785.
Notice of Allowance with Examiner Interview and Amendment dated Apr. 21, 2010 for U.S. Appl. No. 10/832,785.
Notice of Allowance, U.S. Appl. No. 10/831,701, mailed May 14, 2009.
Notice of Allowance mailed Sep. 21, 2009, for U.S. Appl. No. 11/324,845.
Notice of Allowance mailed Dec. 2, 2009, for U.S. Appl. No. 11/324,845.
Notice of Allowance mailed Mar. 16, 2010, for U.S. Appl. No. 11/324,845.
U.S. Appl. No. 60/465,579, filed Apr. 24, 2003.
Office Action, U.S. Appl. No. 11/395,118, mailed Jun. 10, 2009.
Final Office Action, U.S. Appl. No. 11/395,118, mailed Feb. 18, 2010.
Office Action, U.S. Appl. No. 11/537,997, mailed Sep. 25, 2009.
Office Action U.S. Appl. No. 11/537,997, dated Apr. 15, 2010.
Final Office Action dated Jul. 21, 2009 for U.S. Appl. No. 10/942,762.
Non-Final Office Action dated Jan. 15, 2010 for U.S. Appl. No. 10/942,762.
U.S. Appl. No. 60/641,217, filed Dec. 31, 2004.
International Preliminary Report on Patentability dated Mar. 5, 2009, PCT Application No. PCT/US2005/035624.
European Office Action dated Apr. 9, 2009 for EP Patent Application No. 04750678.7.
European Office Action dated Feb. 22, 2010 for EP Patent Application No. 04750678.7.
Chinese Office Action dated Nov. 20, 2009 for CN Patent Application No. 200680032142.X.
Japanese Office Action dated Dec. 22, 2009 for JP Patent Application No. 2006-513342.
US Advisory Action dated Nov. 21, 2007 issued in U.S. Appl. No. 10/832,785.
US Office Action dated Jun. 8, 2009 issued in U.S. Appl. No. 10/832,785.
US Notice of Allowance and Examiner-Initiated Interview Summary dated Aug. 9, 2010 issued in U.S. Appl. No. 10/832,785.
US Advisory Action dated Nov. 27, 2007 issued in U.S. Appl. No. 10/831,701.
US Allowed Claims, U.S. Appl. No. 10/831,701.
US Advisory Action dated Nov. 21, 2008 issued in U.S. Appl. No. 11/324,845.
US Office Action (Examiner Interview Summary) dated Jul. 19, 2010 issued in U.S. Appl. No. 11/537,997.
US Office Action dated Sep. 22, 2010 issued in U.S. Appl. No. 12/019,582.
US Office Action Final dated Aug. 3, 2010 issued in U.S. Appl. No. 10/942,762.
US Examiner Interview Summary dated Oct. 12, 2010 issued in U.S. Appl. No. 10/942,762.
U.S. Appl. No. 60/667,567, filed Mar. 31, 2005, Wong et al.
U.S. Appl. No. 60/722,465, filed Sep. 30, 2005, Tsirigotis et al.
PCT International Search Report dated Aug. 29, 2007 issued in PCT/US2006/038361.
PCT International Preliminary Report on Patentability and Written Opinion dated Aug. 29, 2007 issued in PCT/US2006/038361.
European Supplementary Search Report dated Jun. 4, 2010 issued in EP 06 81 5981.
Office Action mailed Jan. 3, 2007 for U.S. Appl. No. 10/832,785.
Final Office Action mailed Aug. 31, 2007 for U.S. Appl. No. 10/832,785.
Office Action mailed Dec. 18, 2006 for U.S. Appl. No. 10/831,701.
International Search Report mailed May 8, 2007 for PCT Application No. US/2006/25430.
Written Opinion mailed May 8, 2007 for PCT Application No. US/2006/25430.
Final Office Action mailed Sep. 12, 2007, for U.S. Appl. No. 10/831,701.
Office Action mailed Jan. 11, 2008, for U.S. Appl. No. 11/324,845.
Office Action mailed Mar. 23, 2007, for U.S. Appl. No. 10/831,376.
Final Office Action mailed Aug. 10, 2007, for U.S. Appl. No. 10/831,376.
Notice of Allowance mailed Oct. 22, 2007, for U.S. Appl. No. 10/831,376.
Allowed Claims for U.S. Appl. No. 10/831,376 dated Oct. 22, 2007.
Office Action mailed May 28, 2008, for U.S. Appl. No. 10/832,785.
Office Action mailed Jun. 25, 2008, for U.S. Appl. No. 10/831,701.
Final Office Action mailed Sep. 5, 2008, for U.S. Appl. No. 11/324,845.
International Search Report sent Sep. 30, 2008 for PCT Application No. PCT/US05/35624.
Written Opinion sent Sep. 30, 2008 for PCT Application No. PCT/US05/35624.
U.S. Appl. No. 60/478,154, filed Apr. 24, 2003.
U.S. Appl. No. 60/465,578, filed Apr. 24, 2003.
U.S. Appl. No. 60/615,002, filed Sep. 30, 2004.
Office Action mailed Feb. 3, 2005 for U.S. Appl. No. 10/832,927.
Office Action mailed Jun. 22, 2005 for U.S. Appl. No. 10/832,927.
Notice of Allowance mailed Feb. 9, 2006 for U.S. Appl. No. 10/832,927.
Allowed Claims, U.S. Appl. No. 10/832,927, dated Feb. 9, 2006.
U.S. Appl. No. 60/465,580, filed Apr. 24, 2003.
U.S. Appl. No. 60/503,190, filed Sep. 15, 2003.
Final Office Action mailed Jan. 5, 2009 for U.S. Appl. No. 10/832,785.
Final Office Action, U.S. Appl. No. 10/831,701, mailed Jan. 5, 2009.
Office Action mailed Feb. 9, 2009, for U.S. Appl. No. 11/324,845.
European Search Report dated Dec. 14, 2008 for EP Patent Application No. 04750678.7.
International Preliminary Report on Patentability dated Apr. 10, 2008 for PCT Application No. PCT/US2006/038361.
Non-Final Office Action dated Jan. 8, 2009 for U.S. Appl. No. 10/942,762.
US Office Action dated Mar. 11, 2011 issued in U.S. Appl. No. 11/395,118.
US Office Action Final dated Jul. 29, 2011 issued in U.S. Appl. No. 11/395,118.
US Office Action dated Mar. 31, 2011 issued in U.S. Appl. No. 11/537,997.
US Notice of Allowance dated Aug. 5, 2011 issued in U.S. Appl. No. 11/537,997.
US Final Office Action dated Feb. 25, 2011 issued in U.S. Appl. No. 12/019,582.
US Notice of Allowance dated Jun. 15, 2011 issued in U.S. Appl. No. 12/019,582.
US Notice of Allowance dated Sep. 30, 2011 issued in U.S. Appl. No. 12/019,582.
US Office Action dated Jan. 20, 2011 issued in U.S. Appl. No. 11/478,998.
US Office Action dated Jul. 8, 2011 issued in U.S. Appl. No. 11/478,998.
European Examination Report dated Nov. 9, 2010 issued in 04 750 678.7-1245.
European Extended Search Report, supplementary European Search Report, and European Search Opinion dated Jul. 26, 2011 issued in EP 05 802 942.2.
Japanese Office Action (Notice of Grounds for Rejection) dated May 10, 2011 issued in JP 2007-534880.
PCT International Preliminary Report on Patentability and Written Opinion dated Jan. 9, 2008 issued in PCT/US2006/25430.
European Extended Search Report, Supplementary Search Report and Search Opinion dated Feb. 25, 2011 issued in EP 06 785 872.0.
Cams et al.(Oct. 1, 2000) "PVFS: A Parallel File System for Linux Clusters", *Proceedings of the 4th Annual Linux Showcase and Conference*, vol. 4, pp. 317-327, XP002532238, USENIX ASSOC, Atlanta, Georgia.

Katsurashima et al. (2003) "Design and Evaluation of CIFS Server Virtualization Method", Technical Research Report (IEICE), *The Institute of Electronics Information and Communication Engineers*, 103(248): 73-78.

Sheth et al., "Data structure distribution and multi-threading of Linux file system for multiprocessors", 5th International Conference on High Performance Computing, 1998 (HIPC '98); Madras, India Dec. 17-20, 1998, IEEE Comput. Soc, US, Dec. 17, 1998, pp. 97-104, XP010317644, DOI: DOI:10.1109/HIPC.1998.737976.

US Notice of Allowance dated Oct. 19, 2011 issued in U.S. Appl. No. 11/395,118.

US Allowed Claims, U.S. Appl. No. 11/395,118, dated Oct. 19, 2011.

US Allowed Claims, U.S. Appl. No. 11/537,997, dated Aug. 5, 2011.

US Notice of Allowance dated Nov. 28, 2011 issued in U.S. Appl. No. 11/537,997.

US Allowed Claims, U.S. Appl. No. 12/019,582, dated Jun. 15, 2011.

US Notice of Allowance dated Jan. 13, 2012 issued in U.S. Appl. No. 12/019,582.

US Office Action Final dated Dec. 22, 2011 issued in U.S. Appl. No. 11/478,998.

European Summons to attend oral proceedings dated Oct. 6, 2011 issued in EP Patent Application No. 04 750 678.7-1245.

\* cited by examiner

STORAGE POLICY MONITORING FOR A STORAGE NETWORK

CROSS-REFERENCE TO RELATED APPLICATIONS

This application claims priority under: 35 U.S.C. §119(e) to U.S. Provisional Patent Application No. 60/615,002, filed on Sep. 30, 2004, entitled "A LAYER 7 NETWORK ATTACHED STORAGE (NAS) PROTOCOL SWITCH WITH AN EMBEDDED ACCESS FREQUENCY/FILE ATTRIBUTE ACCUMULATOR AND STORAGE POLICY MONITOR," by Thomas K. Wong et al.; 35 U.S.C. §120 as a continuation-in-part to U.S. patent application Ser. No. 10/831,376, filed on Apr. 23, 2004, entitled "TRANSPARENT FILE MIGRATION USING NAMESPACE REPLICATION," by Thomas K. Wong et al.; and is related to U.S. patent application Ser. No. 10/831,701, filed on Dec. 30, 2004, entitled "TRANSPARENT FILE REPLICATION USING NAMESPACE REPLICATION," by Thomas K. Wong et al., each of which applications are herein incorporated by reference in their entirety.

BACKGROUND OF THE INVENTION

1. Field of the Invention

This invention relates generally to storage networks and, more specifically, to selective file migration in a storage network.

2. Description of Related Art

In a computer network, NAS (Network Attached Storage) file servers connected directly to the network provide an inexpensive and easily configurable solution for a storage network. These NAS file servers are self-sufficient because they contain file systems that allow interoperability with clients running any operating system and communication using open protocols. For example, a Unix-based client can use the NFS (Network File System) protocol by Sun Microsystems, Inc. of Santa Clara, Calif. and a Windows-based client can use CIFS (Common Internet File System) by Microsoft Corp. of Redmond, Wash. to access files on a NAS file server. However, the operating system does not affect communication between the client and file server. Thus, NAS file servers provide true universal file access.

By contrast, more expensive and powerful SAN (Storage Area Network) file servers use resources connected by Fibre Channel on a back-end, or a dedicated network. A SAN file system is part of the operating system or an application running on the client. But heterogeneous client operating systems may require additional copies of each file to be stored on the storage network to ensure compatibility on the SAN file server. Additionally, communication between file servers on a SAN use proprietary protocols and thus are typically provided by a common vendor. As a result, NAS file servers are preferred when price and ease of use are major considerations. However, the benefits of NAS storage networks over SAN storage networks also have drawbacks.

One drawback with NAS file servers is that there is no centralized control. Accordingly, each client must maintain communication channels between each of the NFS file servers separately. When NAS file servers are either added or removed from the storage network, each client must mount or unmount directories for the associated storage resources as appropriate. This is particularly inefficient when there are changes in hardware, but not in the particular files available on the network, such as when a failing NAS file server is swapped out for an identically configured back-up NAS file server.

A related drawback is that a client must be reconfigured each time a file is relocated within the storage network, such as during file migration or file replication. The client generates a NAS file handle that identifies a physical location of the directory or file object on the file server. To access the object, the client sends an object access request directly to the NAS file server. When the file is relocated to a different NAS file server, subsequent requests for access to the file require a new look-up to locate the file and generate a new NAS file handle.

An additional drawback is that NAS file servers can become consumed with handling I/O (Input/Output) requests associated with file manipulations and accesses. As a result, additional processing tasks such as queries can unduly burden the NAS file servers. The file server typically walks a tree-structured directory tree in search of information requested by the query, and if there is more than one file system, each file system is individually walked. Consequentially, the file server may either become less responsive to I/O requests or have high latency in responding to the query. In some contexts, high latency will make the results stale.

Furthermore, NAS file servers can become unorganized and inefficient by, for example, storing critical data with other non-critical data. For example, large multimedia collections of MP3s used for leisure by employees can increase latency time in receiving information more germane to the productivity of an enterprise such as financial records. In another example, rarely accessed files may be stored on a premium, high bandwidth file server while often accessed files may be stored on a commodity, lower bandwidth server.

Therefore, what is needed is a network device to provide selectively migrate objects between file servers on a storage network. Furthermore, there is a need for identifying files to be migrated without burdening the file servers in, for example, servicing I/O requests.

BRIEF SUMMARY OF THE INVENTION

The present invention provides selective migration in a storage network in accordance with a policy. The policy can include rules that establish which objects are migrated from a source file server to a destination file server based on file attributes (e.g., file type, file size, last access time, frequency of access). For example, large multimedia files that consume I/O bandwidth on expensive or critical file servers, without adding much value to enterprise productivity, can be migrated to a commodity or less critical file server. In one embodiment, a NAS (Network Attached Storage) switch in the data path of a client and NAS file servers on the storage network, implements selective migration using file handles that are independent of locations on the storage network. Mapping between the file handles which are static and locations which can be dynamic, allows the client to access objects after migration using file handle that persists through the migration process.

An embodiment of a system configured according to the present invention comprises the NAS switch in communication with the client on a front-end of the storage network, and both a source file server and a destination file server on a back-end. The NAS switch associates NAS file handles (e.g., CIFS file handles or NFS file handles) received from the source and destination file servers with switch file handles that are independent of a location. The NAS switch then exports switch file handles to the client. In response to subsequent object access requests from the client, the NAS switch substitutes switch file handles with appropriate NAS file handles for submission to the appropriate NAS file server.

Advantageously, a network device can organize storage networks according to file types and other attributes in order to reserve premium file servers for critical activities, such as servicing I/O requests.

DETAILED DESCRIPTION OF THE INVENTION

Figure 4:
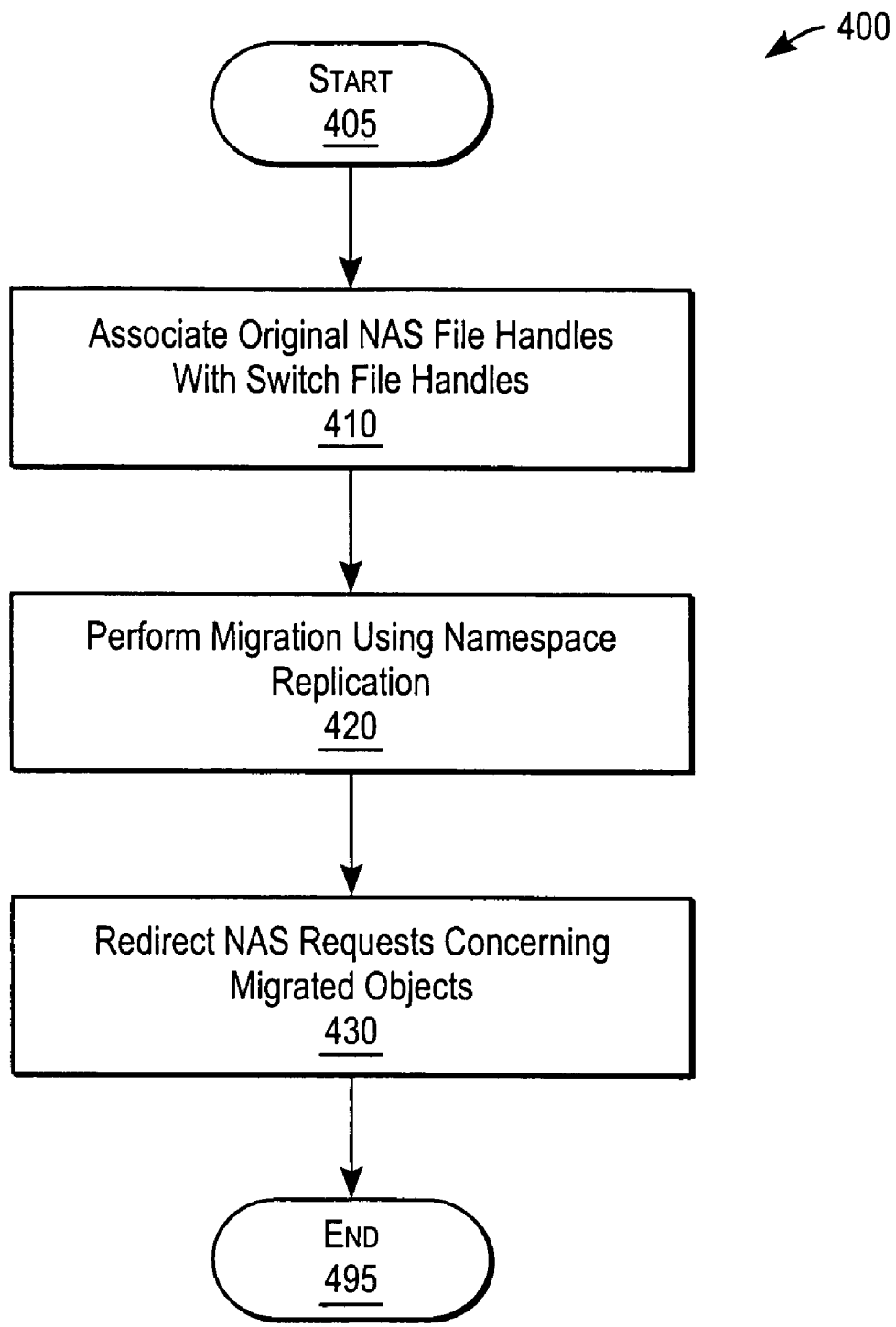
FIG. 4 is a high-level flow chart illustrating a method for providing transparent file migration in a NAS storage network according to one embodiment of the present invention.
Figure 5:
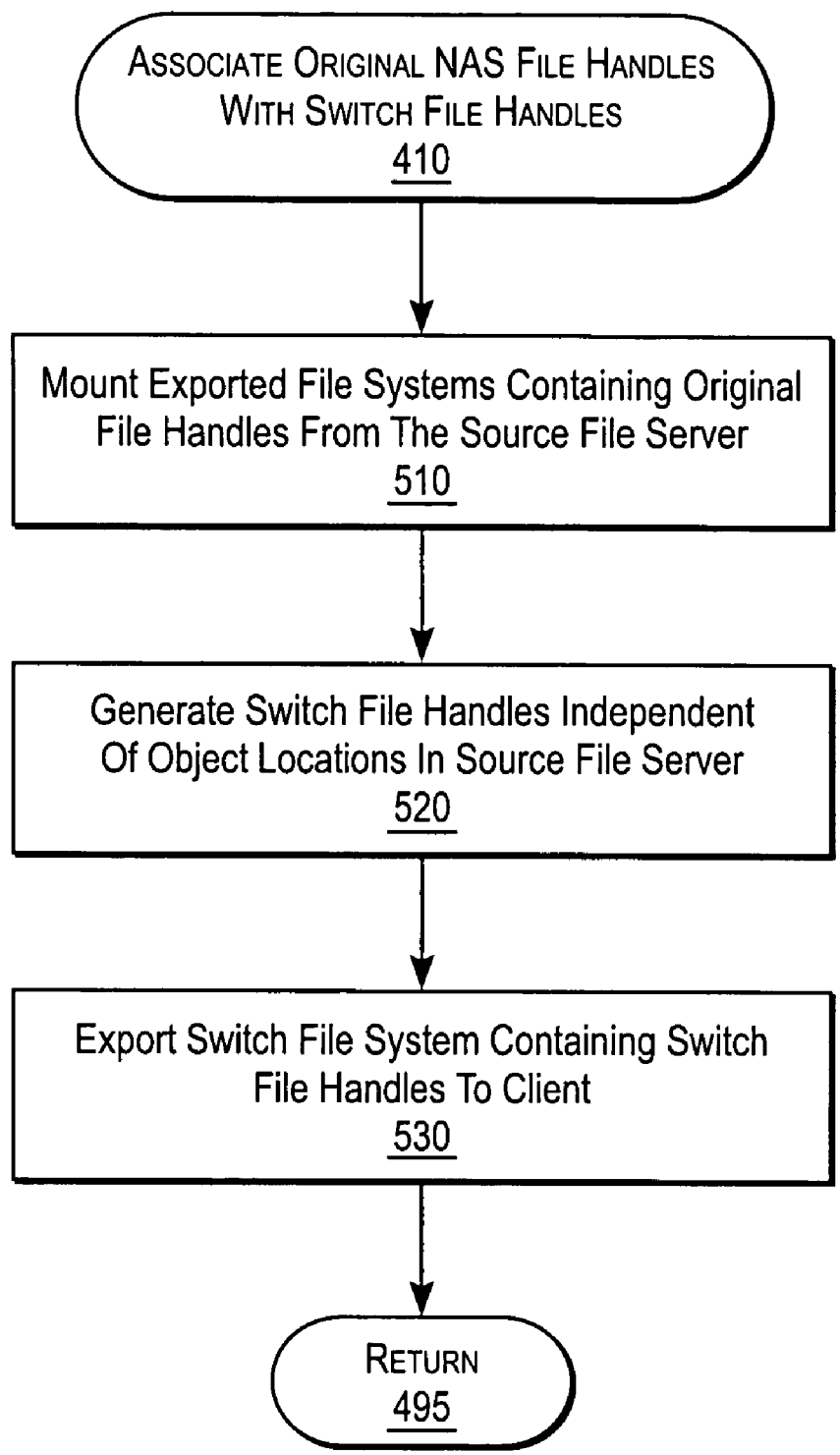
FIG. 5 is a flow chart illustrating a method of associating original NAS file handles with switch file handles according to one embodiment of the present invention.

The present invention provides selective migration in a storage network in accordance with a policy. The policy can include rules that establish which objects are migrated from a source file server to a destination file server. For example, large multimedia files that consume bandwidth on expensive or critical file servers, without adding much value to enterprise productivity, can be migrated to a commodity or less critical file server. In one embodiment, a NAS (Network Attached Storage) switch in the data path of a client and NAS file servers on the storage network, implements selective migration using file handles that are independent of locations on the storage network. Mapping between the file handles which are static and locations which can be dynamic, allows the client to access objects after migration using file handle that persists through the migration. Some embodiments of a system are described with respect to FIGS. 1-3, and some embodiments of a method operating therein are described with respect to FIGS. 4-6.

Figure 1:
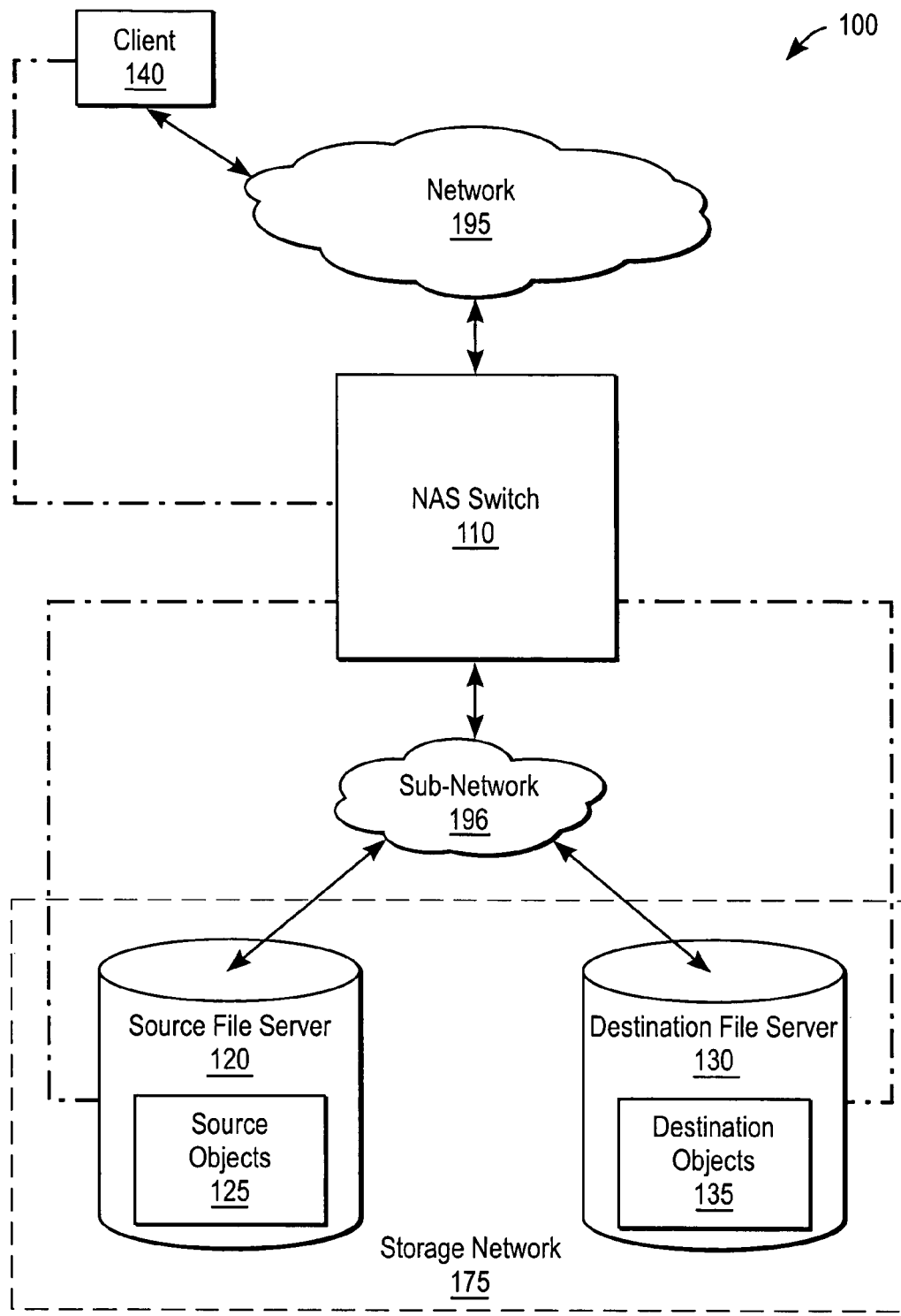
FIG. 1 is a high-level block diagram illustrating a storage network system according to one embodiment of the present invention.

FIG. 1 is a high-level block diagram illustrating a storage network system 100 according to one embodiment of the present invention. The system 100 comprises a NAS switch 110 and a client 140 coupled to a network 195. The NAS switch 110, a source file server 120, and a destination file server 130, are each coupled in communication through a sub-network 196. Note that there can be various configurations of the system 100, such as embodiments including additional clients 140, additional source and/or destination file servers 120, 130, and additional NAS switches 110. The system 100 components are implemented in, for example, a personal computer with an x86-type processor executing an operating system and/or an application program, a workstation, a specialized NAS device with an optimized operating system and/or application program, a modified server blade, etc. In one embodiment, the storage network 175 comprises a NAS using protocols such as NFS and CIFS. In another embodiment, the storage network 175 comprises a combination of NAS, SAN, and other types of storage networks. In yet another embodiment the storage network 175 comprises a decentralized standard or proprietary storage system other than NAS.

The NAS switch 110 selectively migrates objects from a location on the source file server 120 to a location on the destination file server 130. Selective migration can determine which objects to migrated based on file attributes such as file type, file size, file access frequency, other file conditions, schedules, and the like, as determined by a policy. The policy can include rules that delineate certain actions in accordance with certain file attributes or conditions. In one embodiment, the NAS switch 110 can perform a rehearsal that shows the effects of a policy in a report. The policy can be iteratively adjusted to reach desired results.

The NAS switch 110 provides continuous transparency to the client 140 with respect to object management. Specifically, the NAS switch 110 can off-load tasks related to physical configurations, object management, object migration, object replication, efficient storage and/or other services on the storage network 175. Preferably, the NAS switch 110 emulates file server processes to the client 140 and emulates client processes to the file servers 120, 130. Accordingly, the client 140 is unaware of the NAS switch 110 since the NAS switch 110 is able to redirect NAS requests intended for the source file server 120 to appropriate locations on the destination file server 130. Thus, the client 140 submits object requests, such as file writes and directory reads, directly to the NAS switch 110. Likewise, the file servers 120, 130 are unaware of the NAS switch 110 since the NAS switch 110 is able to resubmit requests, contained in server file handles, as if they originated from the client 140. To do so, the NAS switch 110 can use mapping, translating, bridging, packet forwarding, other network interface functionality, and other control processes to perform file handle switching, thereby relieving the client 140 of the need to track changes in a file's physical location.

In one embodiment, the NAS switch 110 receives exported file system directories from the file servers 120, 130 containing NAS switch handles. To create compatibility between the client 140 and the NAS switch 110, the NAS switch 110 maps the file system directories to internal switch file systems which it sends to the client 140. To request an object, the client 140 traverses an exported switch file system and selects a switch file handle which it sends to the NAS switch 110 along with a requested operation.

In general, NAS file handles uniquely identify objects, such as a directory file server, on the file servers 120, 130, such as a directory or file, as long as that object exists. NAS file handles are file server specific, and are valid only to the file servers 120, 130 that issued the file handles. The process of obtaining a file handle from a file name is called a look-up. The NAS file handle may be formatted according to protocols such as NFS or CIFS as discussed in further detail below, e.g., with reference to Tables 1A and 1B. By contrast, a switch file handle identifies a directory or file object independent of location, making it persistent through file replications, migrations, and other data transfers. The switch file handle can be a modified NAS file handle that refers to an internal system within the NAS switch 110 rather than the source file server 120. This enables the NAS switch 110 in mapping persistent file handles to a choice of alternative NAS file handles. An original NAS file handle refers to an initial object location on the source file server 120. A stored NAS file handle refers to a NAS file handle, stored as an object on the file servers 120, 130, which points to an alternative file location.

Object access requests handled by the NAS switch 110 include, for example, directory and/or file reads, writes, creation, deletion, moving, and copying. A namespace access refers to an operation accessing or modifying the namespace such as look-up, rename, delete, or create. A file access refers to an operation accessing or modifying files such as read or write. An object can refer to a directory object or a file object. Directory objects can further comprise sub-directories and file objects within directory. As used herein, various terms are used synonymously to refer to a location of an object prior to migration (e.g., "primary"; "source"; "original"; and "first") and various terms are used to refer to a location of the same object after migration (e.g., "replica"; "destination"; "substitute"; and "second"). Further embodiments of the NAS switch 110 and methods operating therein are described below.

The client 140 accesses resources on the file servers 120, 130 by submitting a switch file handle to the NAS switch 110, intended for the source file server 120. To find the switch handle, the client 140 first mounts an exported switch file system containing switch file handles. The client 140 looks-up an object to obtain its file handle and submits an associated request. From the perspective of the client 140, transactions are carried out by the file servers 120, 130 having object locations that do not change. Thus, the client 140 interacts with the NAS switch 110 before and after a file replication in the same manner. A user of the client 140 can submit operations through a command line interface, a windows environment, a software application, or otherwise. In one embodiment, the NAS switch 110 further provides access to a storage network 175 other than a NAS storage network.

The source file server 120 is the default or original network file server for the client 140 before file migration. The source file server 120 further comprises source objects 125, which include namespace directories and files such as enterprise data, records, database information, applications, and the like. The source file server 120 can store a table of migrated directories maintained by the NAS switch 110 that correlate results from namespace migration. Moreover, the source file server 120 can store a file handle migration table, maintained by the NAS switch 110, denoting each migrated directory and file object. The source file server 120 comprises, for example, a personal computer using an x86-type processor with an operating system and/or an application, a workstation, a specialized NAS device with an optimized operating system and/or application, a modified server blade, etc.

The destination file server 130 becomes the primary network file server used by the NAS switch 110 after file migration. The destination file server 130 further comprises destination objects 135, which include the replicated namespace directories and source files. The destination file server 130 can comprise the same hardware and/or software as described with reference to the source file server 120. The source and destination file servers 120, 130 are preferably NAS file server, but can also be file servers using other decentralized protocols that do not inherently support file migration. Further embodiments of the source and destination file servers 120, 130 and related methods are described below.

The network 195 facilitates data transfers between connected hosts (e.g., 110, 140). The connections to the network 195 may be wired and/or wireless, packet and/or circuit switched, and use network protocols such as TCP/IP (Transmission Control Protocol/Internet Protocol), IEEE (Institute of Electrical and Electronics Engineers) 802.11, IEEE 802.3 (i.e., Ethernet), ATM (Asynchronous Transfer Mode), or the like. The network, 195 comprises, for example, a LAN (Local Area Network), WAN (Wide Area Network), the Internet, and the like. In one embodiment, the NAS switch 110 acts as a gateway between the client 140, connected to the Internet, and the directory file server 120, and the shadow file servers 130, connected to a LAN. The sub-network 196 is preferably a local area network providing optimal response time to the NAS switch 110. In one embodiment, the sub-network 196 is integrated into the network 195.

Figure 2:
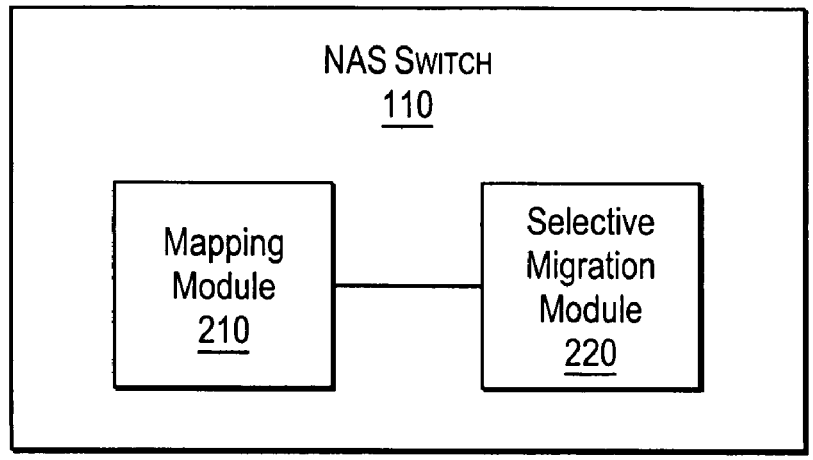
FIG. 2 is a block diagram illustrating the NAS switch according to one embodiment of the present invention.

FIG. 2 is a block diagram illustrating the NAS switch 110 according to one embodiment of the present invention. The NAS switch 110 comprises a mapping module 210 and a selective migration module 220. Generally, the mapping module 210 handles file handles I/O transactions associated with objects, and sends information about successful I/O transactions to the selective migration module 220 for tracking updates to since the last walk of the tree-structured file servers. Note that modules are merely exemplary groupings of functionality.

Prior to file migration, the mapping module 210 receives a switch file handle with a request from the client 140 which it uses to find an original NAS file handle. The mapping module 210 submits the original NAS file handle with the request to the source file server 120. If the object has yet to change locations in the storage network 175, the mapping module 210 uses the original NAS file handle. The mapping module 210 can submit the switch file handle to the migration module 220 to determine if the object is part of a data migration. Also, the file server interface 220 can submit the switch file handle to the redirection module 230 to determine if the object has completed data migration. In either case, an appropriate NAS file handle is returned for the mapping module 210 to use in forwarding the client request to the appropriate file server 120, 130

After file migration, the mapping module 210 looks-up switch file handles received from the client 140 in the file handle migration table. If an object has been migrated, the redirection module outputs a destination NAS file handle corresponding to a location on the destination file server 130.

The selective migration module 220 receives information about successfully I/O transactions from the mapping module 210. In other embodiments, the selective migration module 220 can intercept transactions headed for the mapping module 210, or receive a duplicate of transactions sent to the mapping module 210. Upon executing a policy to migrate objects, the selective migration module 220 can update file locations in the mapping module 210.

Figure 3:
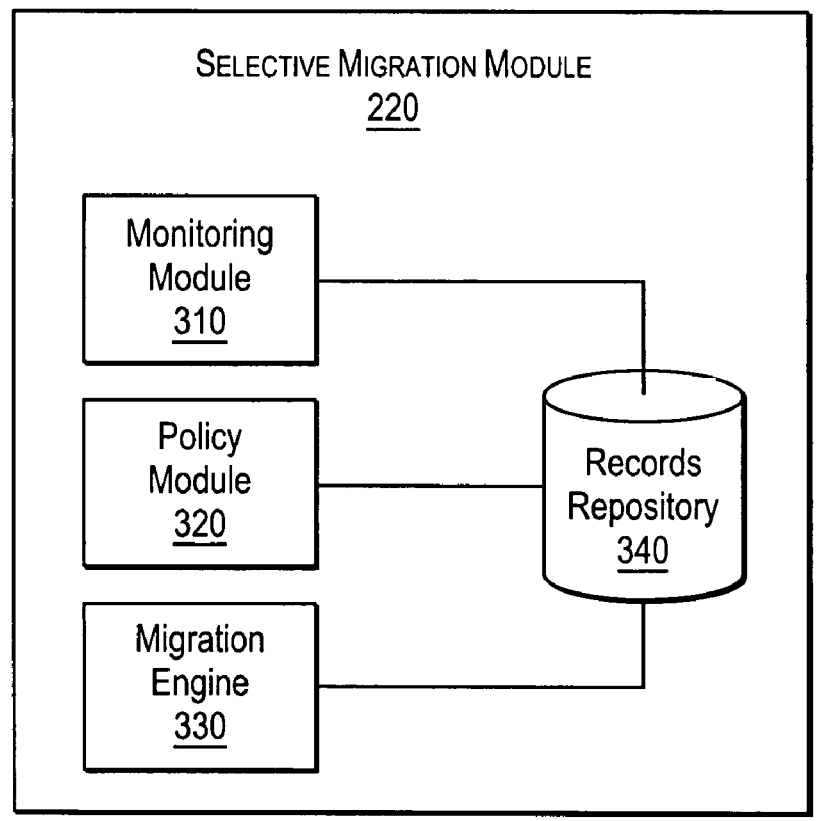
FIG. 3 is a block diagram illustrating a selective migration module according to one embodiment of the present invention.

FIG. 3 is a block diagram illustrating a selective migration module 220 according to one embodiment of the present invention. The selective migration module 220 comprises a monitoring module 310, a policy module 320, a migration engine 330, and a records repository 340. Generally, the records repository is populated using a traversal (walk) of tree-structured directories or shares, and records are updated with information about transactions with objects in the directories. The policy module 320 can perform policy-based migration through query or sorting interactions with the records repository 340.

The monitoring module 310 receives information relating to successful I/O transactions involving objects. The information can form one or more logs. For example, an access log can be updated each time a file or directory is read. Logs can be maintained based on the importance of tracked transactions. For example, while all file or directory creations are tracked, in one embodiment, only the last file modification is tracked. In another optimization, an access log can count accesses over an hour without recording the time of each access. The monitoring module 310 periodically sends the logs to the records repository 340 for processing (e.g., once an hour).

The policy module 320 stores rules for selective migration. The rules can be preconfigured or created by a network administrator. The rules can be Boolean combinations of conditions. For example, FILE TYPE IS MPEG and FILE SIZE IS MORE THAN 100 MEGABYTES. The policy module 320 can implement rules with searches on the records repository 340 to identify files meeting certain conditions. In one embodiment, a user interface (e.g., viewed in a web browser) can allow a network administrator to configure rules. The policy module 320 can be triggered periodically on a per-policy basis such as once a day or once a week.

The migration engine 330 can migrate file identified by the policy module 320. For example, each of the files that have not been accessed in the last year can be moved to a dedicated filer server for rarely accessed files. In one embodiment, the migration engine 320 migrates the namespace associated with each object prior to migrating data associated with each object.

The records repository 340 can store records associated with objects in the tree-structured directories by traversing the tree-structured directories. In response to receiving logs from the monitoring module 310, the records repository 340 can update records. Periodically, the records repository 340 can synch with the directories with traversals.

Figure 6:
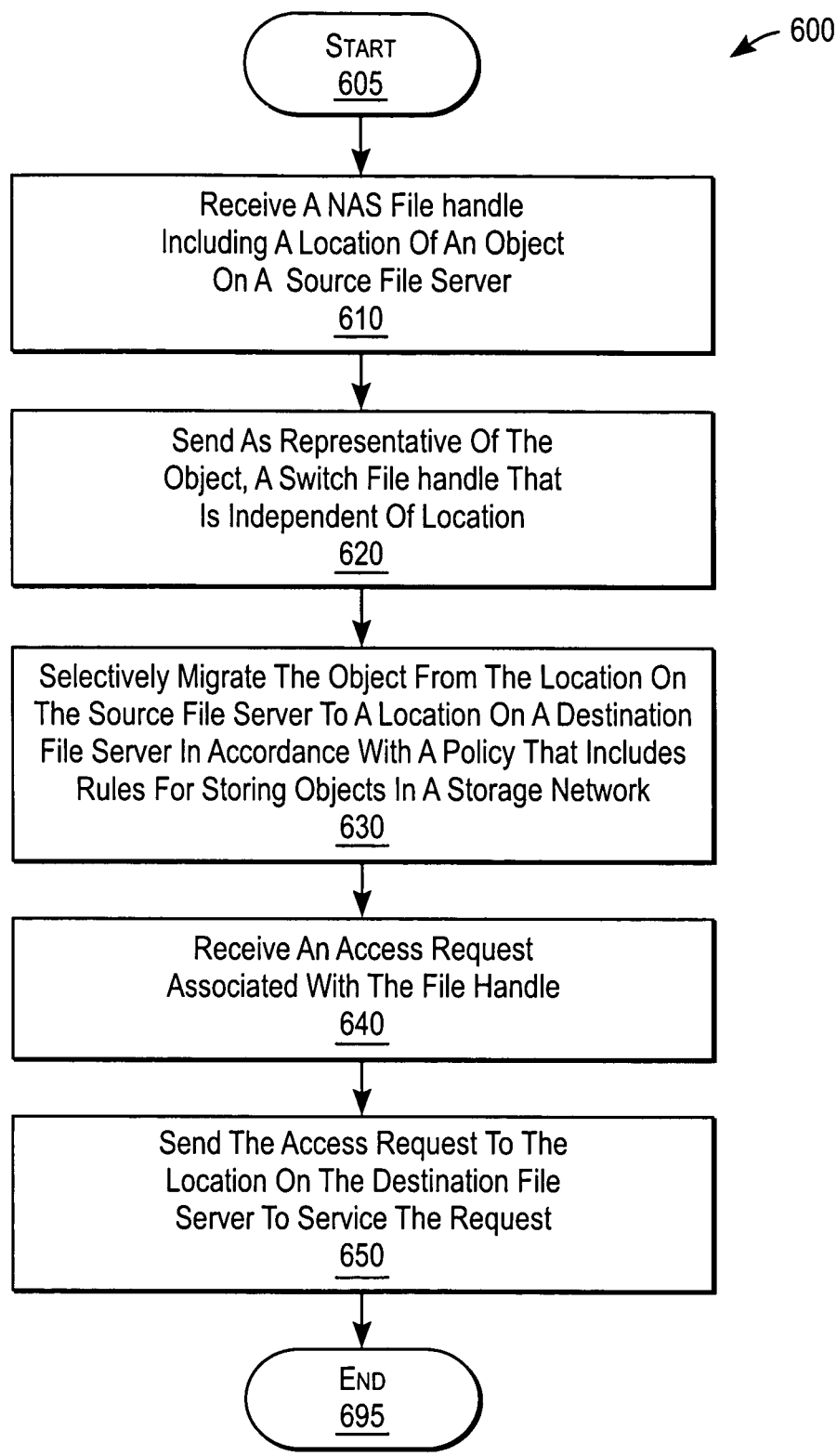
FIG. 6 is a flow chart illustrating a method for providing selective migration in accordance with a policy according to one embodiment of the present invention.

FIG. 6 is a flow chart illustrating a method 600 for providing selective migration in accordance with a policy according to one embodiment of the present invention. A NAS file handle including a location of the object on a source file server is received 610. A switch file handle that is independent of the location of the object is sent as representative of the object 620. The object is selectively migrated 630 from the location on the source file server to a location on a destination file server in accordance with a policy that includes rules for storing objects in the storage network. An access request associated with the switch file handle is received 640. The access request is sent 650 to the location on the destination file server.

Figure 7:
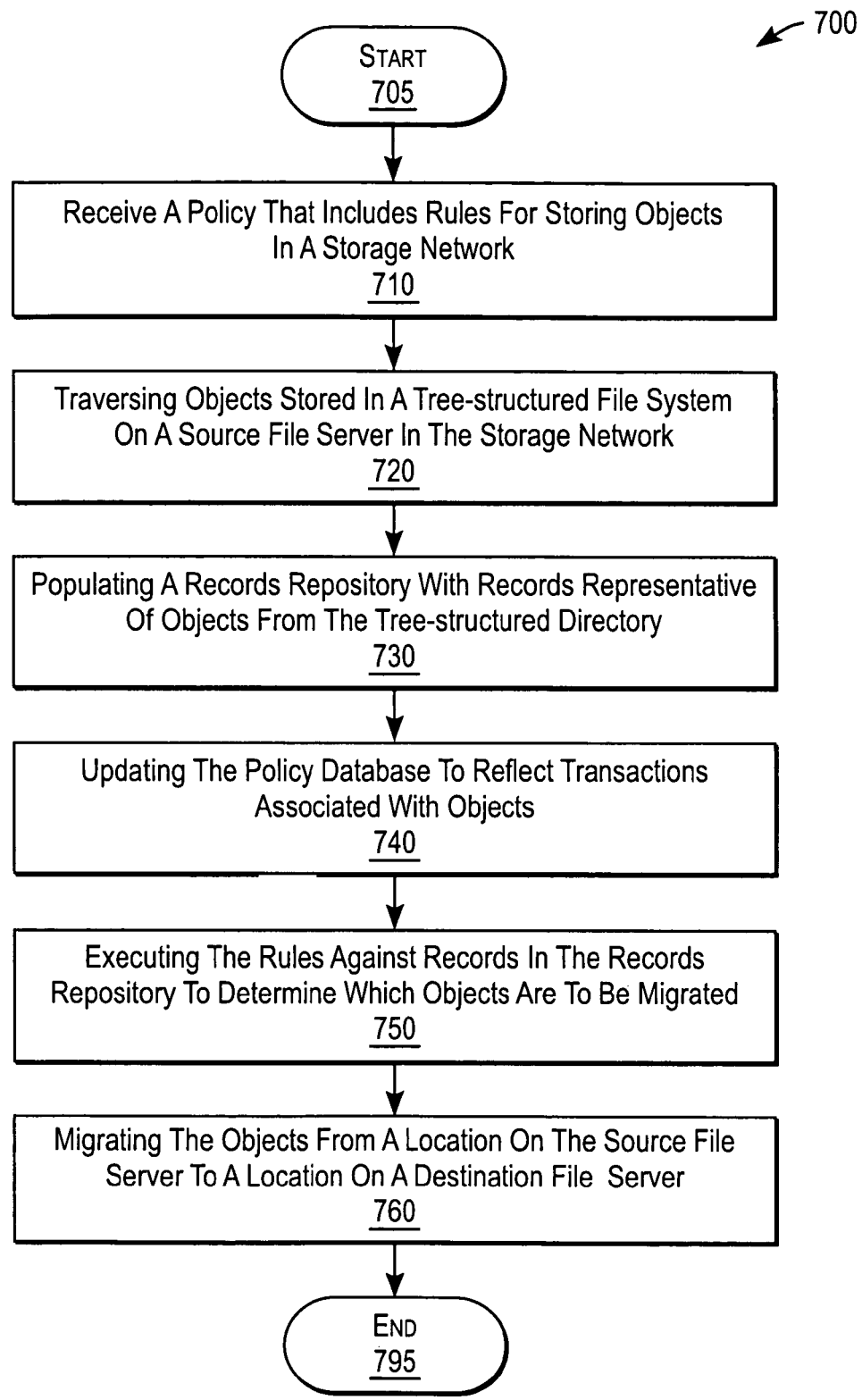
FIG. 7 is a flow chart illustrating a method for providing selective migration in accordance with a policy according to another embodiment of the present invention.

FIG. 7 is a flow chart illustrating a method 700 for providing selective migration in accordance with a policy according to another embodiment of the present invention. A policy that includes rules for storing objects in the storage network is received 710. Objects stored in a tree-structure on a source file server in the storage network are traversed 720. A policy database (or records repository) is populated 730 with records representative of the tree-structure. The policy database is updated 740 to reflect transactions associated with the objects. The rules are executed 750 against records in the policy database to determine which objects are to be migrated. The objects are migrated 760 from a location on the source file server to a location on a destination file server.

The accompanying description is for the purpose of providing a thorough explanation with numerous specific details. Of course, the field of storage networking is such that many different variations of the illustrated and described features of the invention are possible. Those skilled in the art will thus undoubtedly appreciate that the invention can be practiced without some specific details described below, and indeed will see that many other variations and embodiments of the invention can be practiced while still satisfying its teachings and spirit. For example, although the present invention is described with reference to storage networks operating under the NAS protocol, it can similarly be embodied in future protocols for decentralized storage networks other than NAS, or in mixed protocol networks. Accordingly, the present invention should not be understood as being limited to the specific implementations described below, but only by the claims that follow.

The processes, features, or functions of the present invention can be implemented by program instructions that execute in an appropriate computing device. Example computing devices include enterprise servers, application servers, workstations, personal computers, network computers, network appliances, personal digital assistants, game consoles, televisions, set-top boxes, premises automation equipment, point-of-sale terminals, automobiles, and personal communications devices. The program instructions can be distributed on a computer readable medium, storage volume, or the Internet. Program instructions can be in any appropriate form, such as source code, object code, or scripts.

We claim:

1. A method, comprising:
at a Network Attached Storage (NAS) switch, receiving a policy that includes selective migration rules for determining which moving data objects are to be selectively migrated from one file server storage device to another file server storage device in a storage network based at least in part on file attributes;
storing at the NAS switch a records database that contains records representative of data objects stored on a source file server the records comprising file attributes of the data objects but are not the data objects themselves;
at the NAS switch, sending to a client a switch file handle associated with one of the data objects, the switch file handle being independent of a location of the data object;
mapping at the NAS switch the switch file handle to a NAS file handle, wherein the NAS file handle comprises a location of the data object on the source file server;
at the NAS switch, updating the records database to reflect transactions on the source file server, including I/O transactions, associated with the data objects;
at the NAS switch, executing the selective migration rules against records in the records database to determine which data objects are to be migrated; selectively migrating, by the NAS switch, the determined data objects from a location on the source file server to a location on a destination file server; and at the NAS switch, updating the NAS file handle of the data objects to include the location of the data objects on the destination file server.

2. The method of claim 1, wherein the data objects are directories having data objects representative of sub-directories and files.

3. The method of claim 1, wherein the data objects are files.

4. The method of claim 1, wherein data objects having a particular size or size range are migrated.

5. The method of claim 1, wherein data objects having a particular ownership are migrated.

6. The method of claim 1, wherein the data objects on the source file server are stored in a tree structure.

7. The method of claim 1, wherein the data objects are accessible by the client on the source file server and the destination file server, via the NAS switch, so that the client can read, write, create, delete, move, or copy such data objects.

8. The method of claim 1, wherein the policy includes rules regarding last access time or frequency of access of a file server.

9. The method of claim 1, wherein data objects of a particular data type are migrated.

10. A computer readable medium having computer code embodied therein, the computer readable medium comprising:

computer code for receiving at a Network Attached Storage (NAS) switch a policy that includes selective migration rules for determining which moving data objects are to be selectively migrated from one file server storage to another file server storage device in a storage network based at least in part on file attributes;

computer code for storing at the NAS switch a records database that contains records representative of data objects stored on a source file server in the records comprising file attributes of the data objects but are not the data objects themselves;

computer code for sending at the NAS switch to a client a switch file handle associated with one of the data objects, the switch file handle being independent of a location of the data object;

computer code for mapping at the NAS switch the switch file handle to a NAS file handle, wherein the NAS file handle comprises a location of the data object on the source file server;

computer code for updating the records database at the NAS file switch to reflect transactions on the source file server, including I/O transactions, associated with the data objects;

computer code for executing at the NAS switch the selective migration rules against records in the records database to determine which data objects are to be migrated;

computer code for, by the NAS switch, selectively migrating the determined data objects from a location on the source file server to a location on a destination file server; and computer code for updating at the NAS switch the NAS file handle of the data object to include the location of the data object on the destination file server.

11. A NAS (Network Attached Storage) switch to selectively migrate objects in a storage network, comprising:

a policy module to receive a policy that includes selective migration rules for determining which moving data objects are to be selectively migrated from one file server storage device to another file server storage device in a storage network based at least in part on file attributes;

a records database that contains records representative of data objects stored on a source file server in the storage network, the records comprising file attributes of the data objects but are not the data objects themselves;

a client interface to send to a client a switch file handle associated with one of the data objects, the switch file handle being independent of a location of the data object;

a mapping module to map the switch file handle to a NAS file handle, wherein the NAS file handle comprises a location of the data object on the source file server;

a monitoring module to update the records database to reflect transactions on the source file server, including I/O transactions, associated with the data objects, wherein the policy module is further configured to execute the selective migration rules against records in the records database to determine which data objects are to be migrated;

a migration engine to selectively migrate the determined data objects from a location on the source file server to a location on a destination file server; and a file handle updating module to update the NAS file handle of the data object to include the location of the data object on the destination file server.

12. The NAS switch of claim 11, wherein the data objects are files.

13. The NAS switch of claim 11, wherein data objects having a particular size or size range are migrated.

14. The NAS switch of claim 11, wherein data objects having a particular ownership are migrated.

15. The NAS switch of claim 11, wherein the data objects are accessible by the client on the source file server and the destination file server, via the NAS switch, so that the client can read, write, create, delete, move, or copy the data objects.

16. The NAS switch of claim 11, wherein the policy includes rules regarding last access time or frequency of access of a file server.

17. An apparatus in the form of a Network Attached Storage (NAS) switch, comprising:

means for receiving a policy that includes selective migration rules for determining which data objects are to be selectively migrated from one file server storage device to another file server storage device in a storage network based at least in part on file attributes;

means for storing at the NAS switch a records database that contains records representative of data objects stored on a source file server in the records comprising file attributes that of the data objects but are not the data objects themselves;

means for sending to a client a switch file handle associated with one of the data objects, the switch file handle being independent of a location of the data object; and means for mapping at the NAS switch the switch file handle to a NAS file handle, wherein the NAS file handle comprises a location of the data object on the source file server;

means for updating the records database to reflect transactions on the source file server, including I/O transactions, associated with the data objects; means for executing the selective migration rules against records in the records database to determine which data objects are to be migrated;

means for selectively migrating the determined data objects from a location on the source file server to a location on a destination file server; and means for updating the NAS file handle of the data object to include the location of the data object on the destination file server.

18. The apparatus of claim 17, wherein the data objects are files.

19. The apparatus of claim 17, wherein data objects having a particular size or size range are migrated.

20. The apparatus of claim 17, wherein data objects having a particular ownership are migrated.

* * * * *